(12) United States Patent
Dunn et al.

(10) Patent No.: US 12,730,187 B2
(45) Date of Patent: Sep. 8, 2026

(54) PLANETARY RADAR HIGH POWER ARRAY FEED CALIBRATION

(71) Applicant: Raytheon Company, Tewksbury, MA (US)

(72) Inventors: Zachary Dunn, Wylie, TX (US); Domingo Cruz-Pagan, Allen, TX (US)

(73) Assignee: Raytheon Company, Arlington, VA (US)

( * ) Notice: Subject to any disclaimer, the term of this patent is extended or adjusted under 35 U.S.C. 154(b) by 272 days.

(21) Appl. No.: 18/741,649

(22) Filed: Jun. 12, 2024

(65) Prior Publication Data

US 2025/0383425 A1 Dec. 18, 2025

(51) Int. Cl.
*G01S 7/40* (2006.01)
*G01S 13/02* (2006.01)

(52) U.S. Cl.
CPC .............. *G01S 7/40* (2013.01); *G01S 7/4008* (2013.01); *G01S 7/4021* (2013.01); *G01S 2013/0263* (2013.01)

(58) Field of Classification Search
CPC ......... G01S 7/40; G01S 7/4021; G01S 7/4008
See application file for complete search history.

(56) References Cited

U.S. PATENT DOCUMENTS 7,522,096 B2 4/2009 Backes et al.
10,054,439 B2 8/2018 Jensen et al.
2023/0261373 A1 8/2023 Khalil et al.

FOREIGN PATENT DOCUMENTS

DE 10112894 A1 * 10/2002 ........... G01S 7/4056

* cited by examiner

*Primary Examiner* — Resha Desai
*Assistant Examiner* — Helena H Seraydaryan

(57) ABSTRACT

A transmitter system includes a transmitter feed array configured to generate a radio signal. The transmitter system also includes a reflector configured to transmit the radio signal outward in a narrow beam. The transmitter system further includes a sub-reflector configured to receive the radio signal from the transmitter feed array and reflect the radio signal to the reflector before the radio signal is transmitted. The transmitter system also includes a calibration system comprising a first receiver (RX) calibration horn adjacent to the transmitter feed array and a second RX calibration horn disposed in a center of the sub-reflector, the calibration system configured to be used in a RX calibration process and a transmitter (TX) calibration process of the transmitter system.

20 Claims, 5 Drawing Sheets

PLANETARY RADAR HIGH POWER ARRAY FEED CALIBRATION

GOVERNMENT RIGHTS

This invention was made with U.S. government support under contract number NSF AST-1519126 PO: 374179 PD: Z6EZZBFS awarded by the U.S. Department of Defense. The U.S. government has certain rights in the invention.

TECHNICAL FIELD

This disclosure is generally directed to transmitter systems. More specifically, this disclosure is directed to techniques for planetary radar high power array feed calibration.

BACKGROUND

Radio frequency (RF) element calibration is important for proper phase array based transmitter feed operation. Due to the size of a typical high power radio telescope assembly and the high output power requirement of a fully coherent transmitter, a safe terrestrial calibration reflector may not be a readily convincible option. As such, a more unique calibration scheme for the transmitter is desired.

SUMMARY

This disclosure is directed to techniques for planetary radar high power array feed calibration.

In a first embodiment, a transmitter system includes a transmitter feed array configured to generate a radio signal. The transmitter system also includes a large reflector configured to transmit the radio signal outward in a narrow beam. The transmitter system further includes a sub-reflector configured to receive the radio signal from the transmitter feed array and reflect the radio signal to the large reflector before the radio signal is transmitted. The transmitter system also includes a calibration system comprising a first receiver (RX) calibration horn adjacent to the transmitter feed array and a second RX calibration horn disposed in a center of the sub-reflector, the calibration system configured to be used in a RX calibration process and a transmitter (TX) calibration process of the transmitter system.

In a second embodiment, a calibration system includes a sub-reflector provided to form part of a transmitter system. The calibration system also includes a first RX calibration horn disposed adjacent to a transmitter feed array of the transmitter system. The calibration system further includes a second RX calibration horn disposed in a center of the sub-reflector. The calibration system is configured to be used in a RX calibration process and a TX calibration process of the transmitter system.

In a third embodiment, a method includes performing a RX calibration process of a transmitter system using a calibration system. The method also includes performing a TX calibration process of the transmitter system using the calibration system. The transmitter system comprises (i) a transmitter feed array configured to generate a radio signal, (ii) a reflector configured to transmit the radio signal outward in a narrow beam, and (iii) a sub-reflector configured to receive the radio signal from the transmitter feed array and reflect the radio signal to the reflector before the radio signal is transmitted. The calibration system comprises a first RX calibration horn adjacent to the transmitter feed array and a second RX calibration horn disposed in a center of the sub-reflector.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, RF element calibration is important for proper transmitter system operation. For example, a large radio telescope with a high power continuous wave transmitter needs an efficient and cost-effective real-time in-situ calibration approach. In particular, the number of discrete transmission elements required to meet transmission power requirements and that will need independent calibration for phase alignment has daunting calibration time implications. Due to the size of a typical radio telescope assembly and the power output of a fully coherent transmitter, a safe terrestrial calibration reflector may not be a readily convincible option. As such, a more unique calibration scheme for the transmitter is desired.

This disclosure provides techniques for planetary radar high power array feed calibration. As discussed in greater detail below, the disclosed embodiments include a process for calibrating a high-power planetary radar system. In some embodiments, the calibration process involves an receiver (RX) calibration process that establishes the main reflector and sub-reflector orientations, and a transmitter (TX) calibration process that simultaneously synchronizes rolling subsets of TX elements utilizing a simultaneous offset transmission. Note that while this disclosure is described with respect to large array radio telescopes, it will be understood that the principles disclosed here are also applicable to other types of devices or environments.

Figure 1:
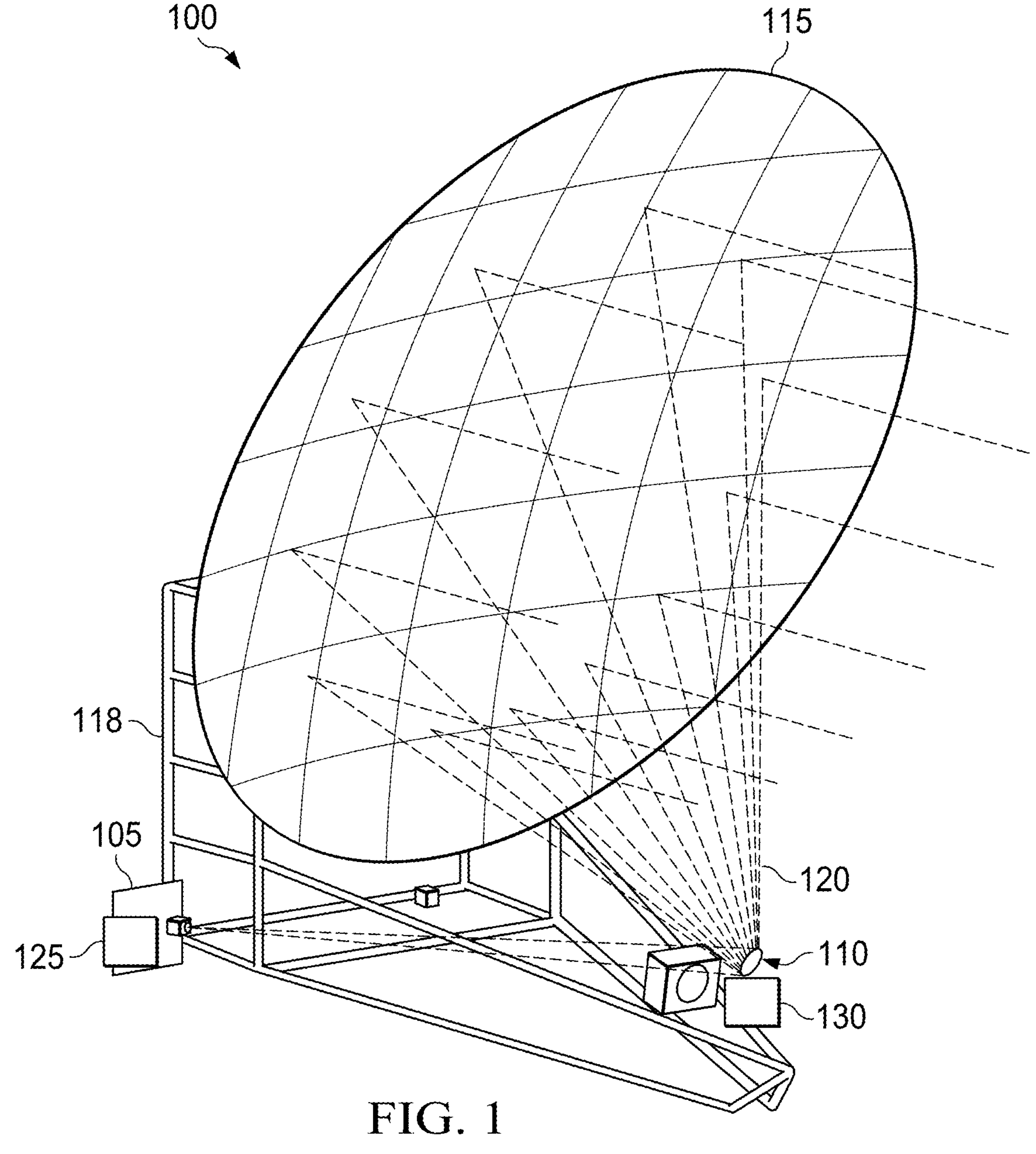
FIG. 1 illustrates an example transmitter subsystem according to this disclosure.

FIG. 1 illustrates an example transmitter subsystem 100 according to this disclosure. As shown in FIG. 1, the transmitter subsystem 100 includes a transmitter feed array 105, a sub-reflector 110, and a large reflector antenna 115. In some embodiments, the transmitter feed array 105, the sub-reflector 110, and the reflector antenna 115 are all mounted on a main superstructure or frame 118.

The transmitter feed array 105 is an active electronic scanned array (AESA) transmitter assembly configured to generate a radio signal 120 to be transmitted by the reflector antenna 115. In some embodiments, the radio signal 120 can be a 500 kW continuous wave (CW) signal at approximately Ku-Band, although other signal powers and frequencies are possible and within the scope of this disclosure. In some embodiments, the transmitter feed array 105 is approximately 1.1 meters×1.1 meters and is comprised of 49 sub-arrays, each capable of independent beam steering. Each sub-array includes multiple (e.g., 64) TX elements, each with its own independent time delay unit. Of course, other sizes and numbers of sub-arrays are possible and within the scope of this disclosure. In some embodiments, the transmitter feed array 105 can generate approximately 1.0 MW of dissipated power, depending on the size and power. In some embodiments, the transmitter feed array 105 may be fixedly mounted on the main superstructure 118, such that the transmitter feed array 105 does not move independently of the main superstructure 118.

The sub-reflector 110 receives the radio signal 120 from the transmitter feed array 105 and reflects the radio signal 120 to the reflector antenna 115, where the radio signal 120 can be transmitted to outer space, for example. In some embodiments, the sub-reflector 110 is a unshaped hyperboloid with outer dimensions of approximately 3.0 meters×3.058 meters. Of course, other sizes and shapes for the sub-reflector 110 are possible and within the scope of this disclosure. The sub-reflector 110 can execute small physical adjustments in translation and roll, relative to the main superstructure 118.

The reflector antenna 115 is a large radio reflector dish that can be at least 50 meters across. In some embodiments, the reflector antenna 115 is approximately 100 meters across. Of course, other sizes are possible and within the scope of this disclosure. The reflector antenna 115 transmits the radio signal 120 outward in a narrow beam. In some embodiments, the 3 dB beamwidth is approximately 0.014 degrees, and the antenna gain is approximately 81 dBi. In some embodiments, the reflector antenna 115 may be fixedly mounted on the main superstructure 118, such that the reflector antenna 115 does not move independently of the main superstructure 118.

In order for the transmitter subsystem 100 to perform accurately, it is important to make sure that the radio signal 120 from the transmitter feed array 105 is coherent, that the sub-reflector 110 is oriented correctly to receive and reflect the radio signal 120 to the reflector antenna 115, and that the reflector antenna 115 is oriented correct to direct the radio signal 120 outward in the correct direction. In order to accomplish this, the transmitter subsystem 100 is calibrated before the radio signal 120 is transmitted out.

Figure 2:
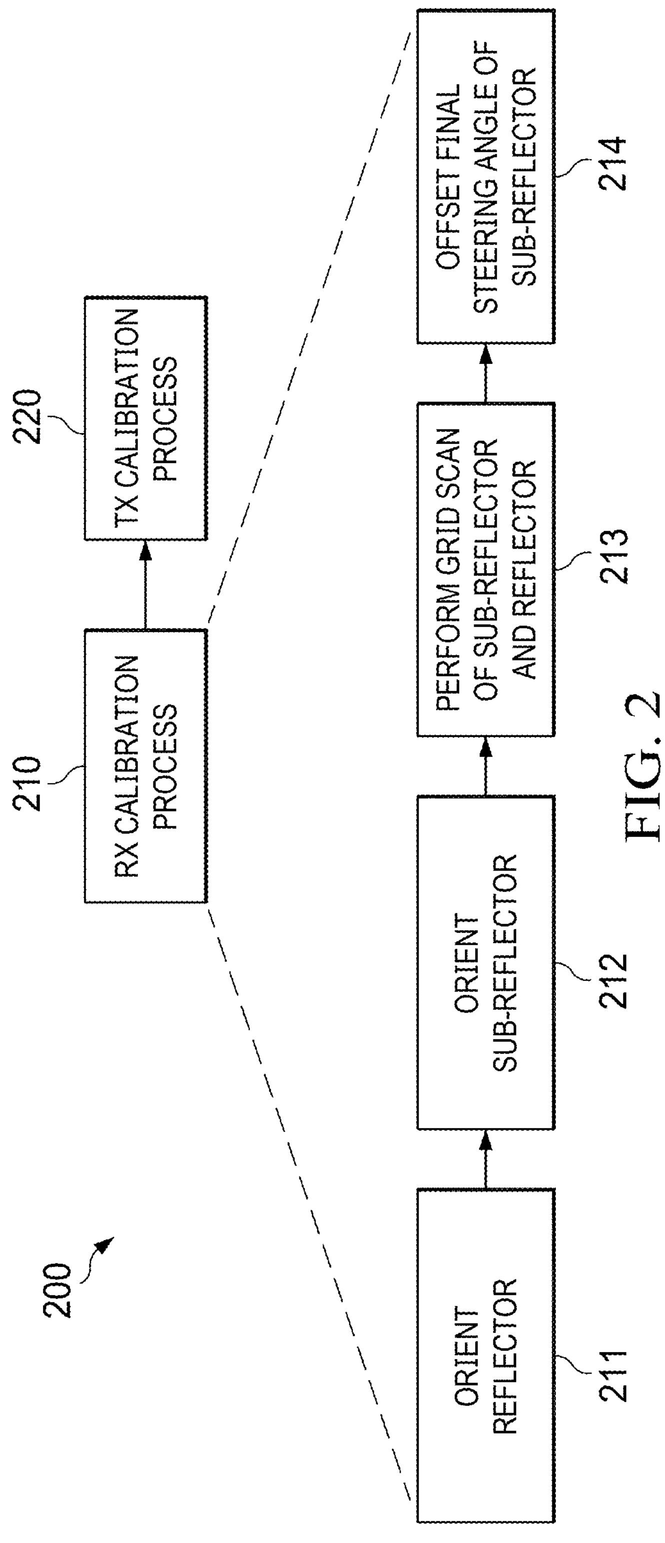
FIG. 2 illustrates an example calibration process according to this disclosure.
Figure 3:
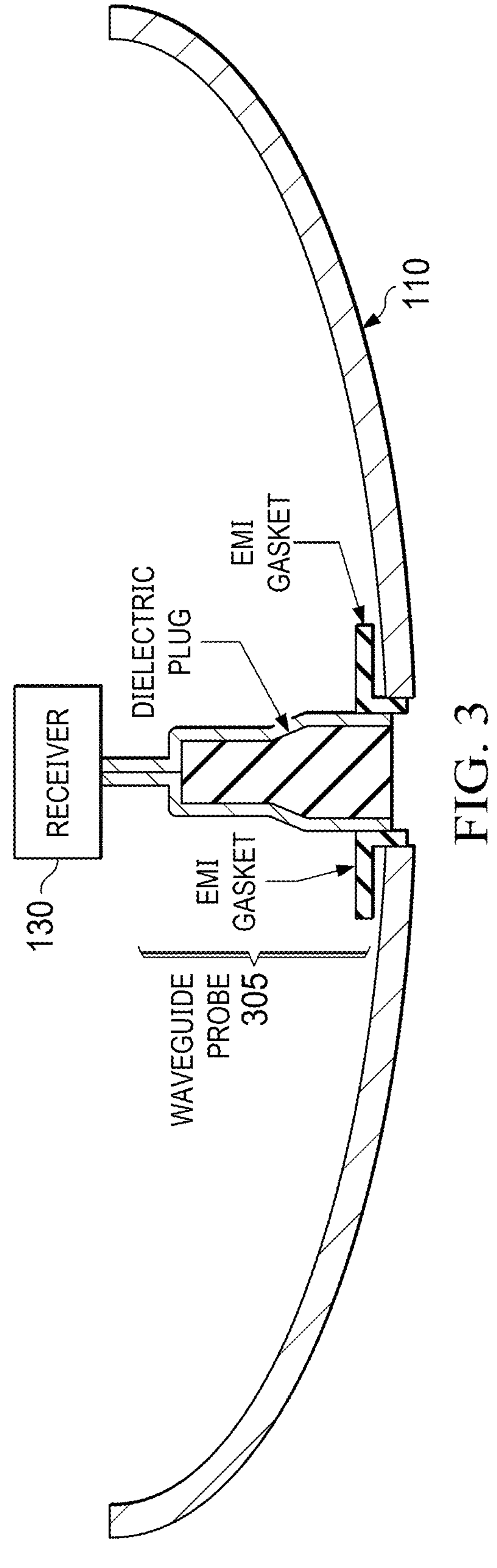
FIG. 3 illustrates an example of a sub-reflector according to this disclosure.

FIG. 2 illustrates an example calibration process 200 according to this disclosure. Referring back to FIG. 1, the calibration process 200 is performed using a calibration system that includes a RX calibration horn 125 adjacent to the transmitter feed array 105, and a RX calibration horn 130 integrated into the center of the sub-reflector 110. The RX calibration horn 125 is mounted adjacent to the transmitter feed array 105 at a known fixed location and does not move independently of the main superstructure 118. FIG. 3 illustrates an example of the sub-reflector 110 showing the RX calibration horn 130 disposed in the center of the sub-reflector 110, and a standard waveguide probe 305.

As shown in FIG. 2, the calibration process 200 involves an RX calibration process 210 that establishes the orientation of the reflector antenna 115 and the sub-reflector 110. The RX calibration process 210 is followed by a TX calibration process 220 that simultaneously synchronizes rolling sets of TX elements of the transmitter feed array 105 utilizing simultaneous offset transmissions. The calibration process 200 also uses known 3D coordinates of the transmitter feed array 105, the sub-reflector 110, and the reflector antenna 115 to ensure TX alignment.

In one aspect of operation, the RX calibration process 210 is performed as follows. At operation 211, the reflector antenna 115 is oriented to an estimated ideal steering angle toward a known target (such as a quasar or other distant astronomical object). At operation 212, the sub-reflector 110 is oriented to an estimated ideal angle toward the RX calibration horn 125 mounted adjacent to the transmitter feed array 105. Once the orientations of the reflector antenna 115 and the sub-reflector 110 are estimated, a grid scan is performed at operation 213. The grid scan is performed to maximize the power of the RX response at the RX calibration horn 125, and includes an alternating 3D grid scan of the sub-reflector 110 position and angle, and a 2D scan of the reflector antenna 115 steering angle (both azimuth and elevation). Once the steering angle of the sub-reflector 110 is determined with respect to the RX calibration horn 125, at operation 214, the final steering angle of the sub-reflector 110 is determined by offsetting from the phase center of the RX calibration horn 125 to the phase center of the transmitter feed array 105.

Once the RX calibration process 210, the TX calibration process 220 is performed. In the TX calibration process 220, only subsets of the TX elements of the transmitter feed array 105 are activated at a time, in order to not overwhelm the RX calibration horn 130 centered at the sub-reflector 110. In other words, only certain individual channels in the transmitter feed array 105 are activated at a time, while all inactive antenna elements are commanded to the load state. The transmitter feed array 105 transmits high pulse compression ratio waveforms through all sub-arrays, which are received at the RX calibration horn 130.

Figure 4:
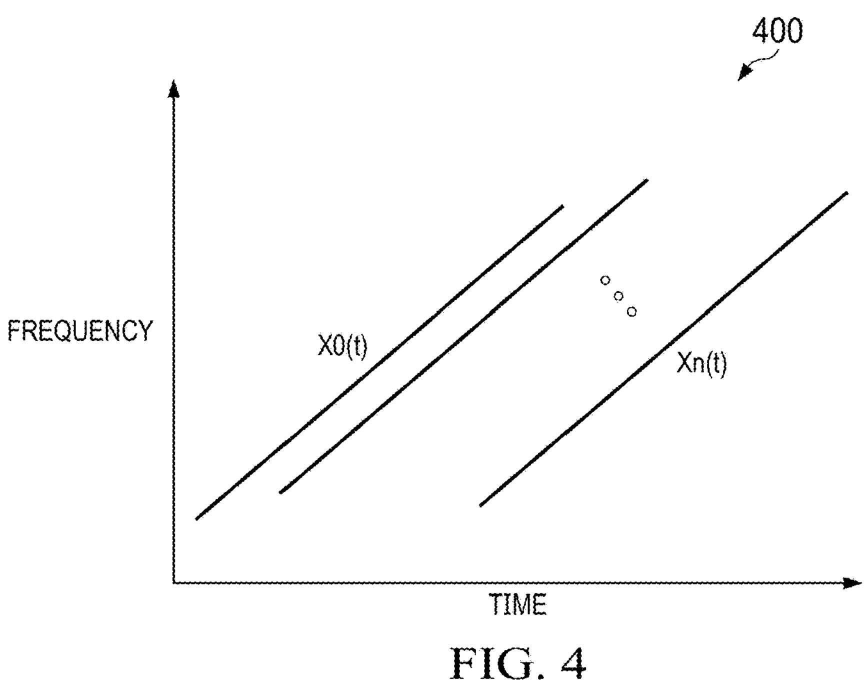
FIG. 4 illustrates an example chart showing various subsets of transmitting waveforms according to this disclosure.

The sub-arrays each have their own time delay units, which means that the waveforms are transmitted to the RX calibration horn 130 at unique predetermined modulation start times. In other words, there is a unique delay for each subset of TX elements. This allows the receiver of the RX calibration horn 130 to isolate individual signals. FIG. 4 illustrates an example chart 400 showing the various subsets of TX elements $X_0(t)$-$X_n(t)$. A time delay exists between consecutive transmissions of the TX element subsets, as shown in the chart 400.

Following the capture of the TX elements dataset, the data is filtered to extract measured amplitudes, phases, and relative delays, and to map to the specific transmitting elements. Simultaneous offset transmissions from the transmitter feed array 105 allow for simultaneously synchronizing rolling sets of TX elements. The ideal phase progression for each element is calculated, and the correct measured value at the sub-reflector 110 is determined. Then the sum of phase errors for all elements is calculated relative to a chosen reference element, and the minimum error set is selected.

Once the TX calibration process 220 is completed, the transmitter subsystem 100 is calibrated, and the system can transmit on the transmitter subsystem 100.

Figure 5:
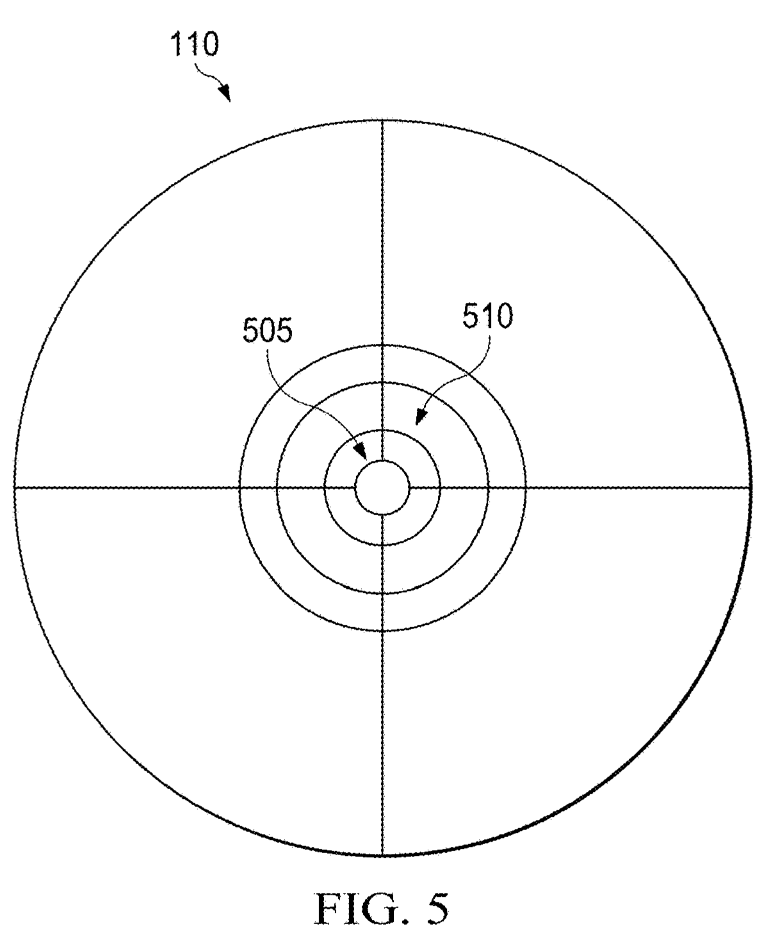
FIG. 5 illustrates another example of a sub-reflector with a meta-surface shutter according to this disclosure.

As described earlier with respect to FIG. 3, the sub-reflector 110 can include the waveguide probe 305. Additionally or alternatively, the sub-reflector 110 can include a meta-surface shutter. FIG. 5 illustrates another example of the sub-reflector 110 with a meta-surface shutter 505 according to this disclosure. As shown in FIG. 5, the meta-surface shutter 505 is disposed in the center of the sub-reflector 110. One or more meta-surface impedance matching sections 510 are disposed around the meta-surface shutter 505. The meta-surface shutter 505 enables simple and accurate calibration using the center of the sub-reflector 110. The meta-surface shutter 505 and the meta-surface impedance matching sections 510 can be designed to manipulate the reflected energy and guide the reflections to specific directions. In some embodiments, a small percentage of the central area of the meta-surface shutter 505 can be an RF window to let the RF calibration signal be received by the RX calibration horn 130. The remaining area can be physically and electrically blended with the sub-reflector 110 to achieve the require reflection direction and levels to minimize the radiation efficiency degradation. In some embodiments, the meta-surface shutter 505 can be a dual lens meta-surface shutter, where the first lens is a reflector only and the second lens is an RF window. The lenses can be switched depending on the mode of operation.

Although FIGS. 1 through 5 illustrate an example transmitter subsystem 100 and related details for calibrating the transmitter subsystem 100, various changes may be made to FIGS. 1 through 5. For example, various components shown and described above may be combined, further subdivided, replicated, rearranged, or omitted and additional components may be added according to particular needs. Also, while shown as a series of steps, various steps shown in FIG. 2 could overlap, occur in parallel, occur in a different order, or occur multiple times. Moreover, some steps could be combined or removed and additional steps could be added according to particular needs.

Figure 6:
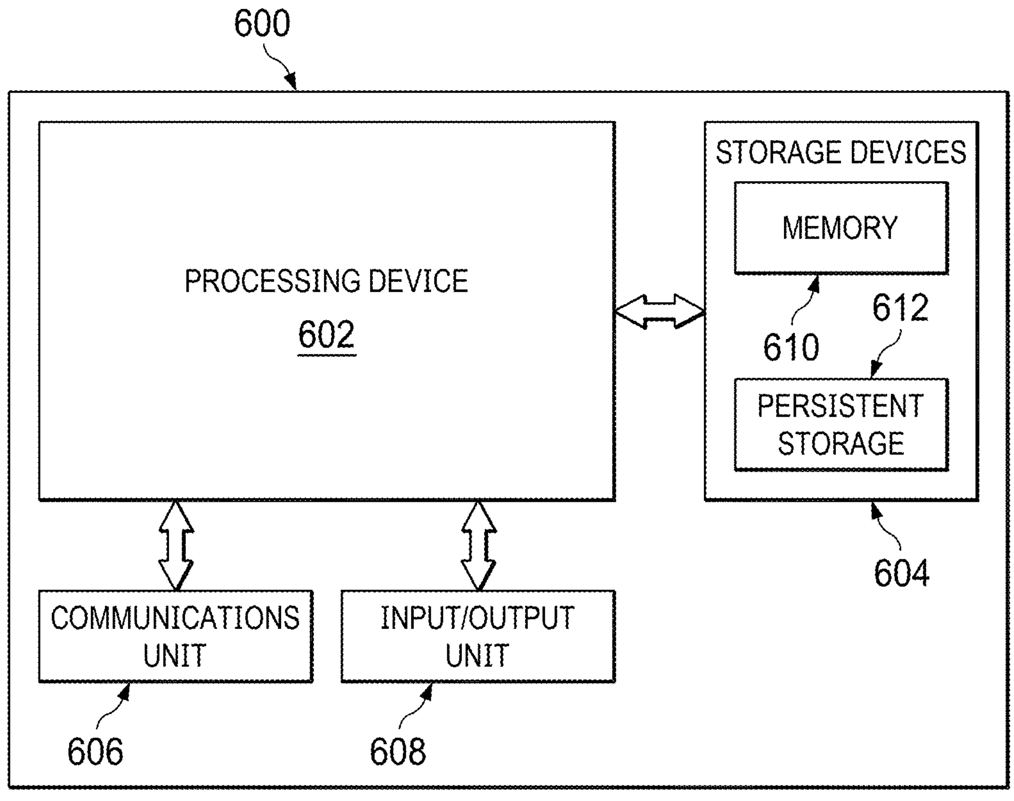
FIG. 6 illustrates an example device for use in calibrating a transmitter subsystem according to this disclosure.

FIG. 6 illustrates an example device 600 for use in a calibrating a transmitter subsystem according to this disclosure. One or more instances of the device 600 may, for example, be used to at least partially implement the calibration process 200 of FIG. 2. However, the operations of the calibration process 200 may be implemented in any other suitable manner.

As shown in FIG. 6, the device 600 denotes a computing device, system, or receiver that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other devices in any suitable arrangement. Example types of processing devices 602 include one or more microprocessors, microcontrollers, digital signal processors (DSPs), application specific integrated circuits (ASICs), field programmable gate arrays (FPGAs), or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display, printer, or other suitable output device. Note, however, that the I/O unit 608 may be omitted if the device 600 does not require local I/O, such as when the device 600 can be accessed remotely.

Although FIG. 6 illustrates one example of a device 600 for use in calibrating a transmitter subsystem, various changes may be made to FIG. 6. For example, computing devices and systems come in a wide variety of configurations, and FIG. 6 does not limit this disclosure to any particular computing device or system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A transmitter system comprising:

a transmitter feed array configured to generate a radio signal;

a reflector configured to transmit the radio signal outward in a narrow beam;

a sub-reflector configured to receive the radio signal from the transmitter feed array and reflect the radio signal to the reflector before the radio signal is transmitted; and a calibration system comprising a first receiver (RX) calibration horn adjacent to the transmitter feed array and a second RX calibration horn disposed in a center of the sub-reflector, the calibration system configured to be used in a RX calibration process and a transmitter (TX) calibration process of the transmitter system.

2. The transmitter system of claim 1, wherein:

the RX calibration process is performed to establish orientations of the reflector and the sub-reflector; and the TX calibration process is performed to simultaneously synchronize multiple subsets of TX elements of the transmitter feed array utilizing a simultaneous offset transmission.

3. The transmitter system of claim 1, wherein during the RX calibration process:

the reflector is oriented toward a known target;

the sub-reflector is oriented toward the first RX calibration horn;

the first RX calibration horn is configured to receive signals from the sub-reflector during a grid scan of the sub-reflector and the reflector; and a final steering angle of the sub-reflector is determined by offsetting from the first RX calibration horn.

4. The transmitter system of claim 1, wherein during the TX calibration process, the transmit feed array is configured to activate different subsets of TX elements at a time to transmit high pulse compression ratio waveforms to the second RX calibration horn.

5. The transmitter system of claim 1, wherein:

the transmitter feed array comprises an active electronic scanned array (AESA) transmitter assembly; and the reflector comprises a radio reflector dish that is at least 50 meters across.

6. The transmitter system of claim 1, wherein the sub-reflector comprises a meta-surface shutter.

7. The transmitter system of claim 1, wherein the transmitter feed array, the sub-reflector, and the reflector are mounted on a main superstructure.

8. A calibration system comprising:

a sub-reflector provided to form part of a transmitter system;

a first receiver (RX) calibration horn disposed adjacent to a transmitter feed array of the transmitter system; and a second RX calibration horn disposed in a center of the sub-reflector, wherein the calibration system is configured to be used in a RX calibration process and a transmitter (TX) calibration process of the transmitter system.

9. The calibration system of claim 8, wherein:

the RX calibration process is performed to establish orientations of the sub-reflector and a reflector of the transmitter system; and the TX calibration process is performed to simultaneously synchronize multiple subsets of TX elements of the transmitter feed array utilizing a simultaneous offset transmission.

10. The calibration system of claim 8, wherein during the RX calibration process:

the sub-reflector is oriented toward the first RX calibration horn;

the first RX calibration horn is configured to receive signals from the sub-reflector during a grid scan of the sub-reflector; and a final steering angle of the sub-reflector is determined by offsetting from the first RX calibration horn.

11. The calibration system of claim 8, wherein during the TX calibration process, the second RX calibration horn is configured to receive high pulse compression ratio waveforms transmitted by different subsets of TX elements of the transmit feed array at a time.

12. The calibration system of claim 8, wherein:

the transmitter feed array comprises an active electronic scanned array (AESA) transmitter assembly; and the transmitter system further includes a radio reflector dish that is at least 50 meters across.

13. The calibration system of claim 12, wherein the sub-reflector comprises a meta-surface shutter.

14. The calibration system of claim 12, wherein the transmitter feed array, the sub-reflector, and the radio reflector dish are mounted on a main superstructure.

15. A method comprising:

performing a receiver (RX) calibration process of a transmitter system using a calibration system; and performing a transmitter (TX) calibration process of the transmitter system using the calibration system, wherein the transmitter system comprises (i) a transmitter feed array configured to generate a radio signal, (ii) a reflector configured to transmit the radio signal outward in a narrow beam, and (iii) a sub-reflector configured to receive the radio signal from the transmitter feed array and reflect the radio signal to the reflector before the radio signal is transmitted, and wherein the calibration system comprises a first RX calibration horn adjacent to the transmitter feed array and a second RX calibration horn disposed in a center of the sub-reflector.

16. The method of claim 15, wherein:

the RX calibration process is performed to establish orientations of the reflector and the sub-reflector; and the TX calibration process is performed to simultaneously synchronize multiple subsets of TX elements of the transmitter feed array utilizing a simultaneous offset transmission.

17. The method of claim 15, wherein performing the RX calibration process comprises:

orienting the reflector toward a known target;

orienting the sub-reflector toward the first RX calibration horn;

receiving signals from the sub-reflector at the first RX calibration horn during a grid scan of the sub-reflector and the reflector; and determining a final steering angle of the sub-reflector by offsetting from the first RX calibration horn.

18. The method of claim 15, wherein performing the TX calibration process comprises:

activating different subsets of TX elements of the transmit feed array at a time to transmit high pulse compression ratio waveforms to the second RX calibration horn.

19. The method of claim 15, wherein:

the transmitter feed array comprises an active electronic scanned array (AESA) transmitter assembly; and the reflector comprises a radio reflector dish that is at least 50 meters across.

20. The method of claim 15, wherein the sub-reflector comprises a meta-surface shutter.

* * * * *